United States Patent
Lanzinger et al.

(10) Patent No.: US 7,680,103 B2
(45) Date of Patent: Mar. 16, 2010

(54) DEVICE AND METHOD FOR BILLING CONNECTIONS THAT ARE ROUTED VIA A PACKET NETWORK

(75) Inventors: Karl Lanzinger, München (DE); Norbert Löbig, Darmstadt (DE)

(73) Assignee: Nokia Siemens Networks GmbH & Co., KG, Munich (DE)

( * ) Notice: Subject to any disclaimer, the term of this patent is extended or adjusted under 35 U.S.C. 154(b) by 696 days.

(21) Appl. No.: 10/592,294

(22) PCT Filed: Mar. 1, 2005

(86) PCT No.: PCT/EP2005/050878
§ 371 (c)(1),
(2), (4) Date: Sep. 8, 2006

(87) PCT Pub. No.: WO2005/086484
PCT Pub. Date: Sep. 15, 2005

(65) Prior Publication Data
US 2007/0159972 A1 Jul. 12, 2007

(30) Foreign Application Priority Data
Mar. 9, 2004 (DE) .................. 10 2004 011 459

(51) Int. Cl.
*H04L 12/28* (2006.01)
(52) U.S. Cl. .................. 370/389; 370/338; 370/390; 370/432; 370/445
(58) Field of Classification Search .................. 370/338, 370/389, 390, 432, 445, 461
See application file for complete search history.

(56) References Cited

U.S. PATENT DOCUMENTS

| | | | | |
|---|---|---|---|---|
| 5,241,534 A | * | 8/1993 | Omuro et al. | 370/218 |
| 6,285,748 B1 | * | 9/2001 | Lewis | 379/112.01 |
| 6,338,046 B1 | * | 1/2002 | Saari et al. | 705/34 |
| 6,445,916 B1 | * | 9/2002 | Rahman | 455/423 |
| 6,512,761 B1 | | 1/2003 | Schuster et al. | |

(Continued)

FOREIGN PATENT DOCUMENTS

DE     696 25 079 T2     8/1998

(Continued)

OTHER PUBLICATIONS

A. Itoh and N. Miyaho, "Function test methods using test cells for ATM switching system", Communications, 1995, ICC 95 Seattle, Gateway to Globalization, 1995 IEEE International Conference, Jun. 18-22, 1995, vol. 2, pp. 982-987, Abstract.

(Continued)

*Primary Examiner*—Ayaz R Sheikh
*Assistant Examiner*—Andrew C Lee
(74) *Attorney, Agent, or Firm*—Dickinson Wright PLLC

(57) ABSTRACT

In one aspect, a method for billing for a connection routed via a packet network is provided. According to the method, billing is started the when the connection is established between a plurality of subscriber terminals. Information packets are transmitting according to a quality standard by at least one of the terminals. The information packets are routed in the network via a central device controlling a quality. The billing is stopping if the quality standard is not met.

17 Claims, 2 Drawing Sheets

U.S. PATENT DOCUMENTS

| | | | |
|---|---|---|---|
| 6,636,487 | B1 | 10/2003 | Roy |
| 6,854,014 | B1 * | 2/2005 | Amin et al. .................. 709/227 |
| 7,028,088 | B1 * | 4/2006 | Koperda et al. ............. 709/229 |
| 7,215,666 | B1 * | 5/2007 | Beshai et al. ................ 370/380 |
| 7,251,256 | B1 * | 7/2007 | Barry et al. .................. 370/503 |
| 7,324,634 | B2 * | 1/2008 | Hoy et al. .................... 379/133 |
| 2002/0039347 | A1 * | 4/2002 | Matsugatani et al. ........ 370/203 |
| 2002/0122429 | A1 | 9/2002 | Griggs |
| 2003/0063578 | A1 | 4/2003 | Weaver |
| 2003/0083870 | A1 * | 5/2003 | Lee et al. ..................... 704/229 |
| 2003/0120773 | A1 * | 6/2003 | Mueller et al. ............... 709/224 |
| 2003/0235214 | A1 * | 12/2003 | Leroux et al. ................ 370/504 |
| 2005/0128955 | A1 * | 6/2005 | Chang et al. ................. 370/252 |
| 2006/0191001 | A1 * | 8/2006 | Winter ......................... 726/13 |

FOREIGN PATENT DOCUMENTS

| | | |
|---|---|---|
| DE | 198 49 540 A1 | 1/2000 |
| DE | 199 83 403 T1 | 5/2001 |
| EP | 0 848 560 A2 | 6/1998 |
| EP | 1 039 688 A2 | 9/2000 |
| EP | 1 223 708 A2 | 7/2002 |
| EP | 1 267 584 A1 | 12/2002 |
| JP | 2002027150 A | 1/2002 |
| WO | WO 98/47308 A1 | 10/1998 |
| WO | WO 99/07108 A2 | 2/1999 |
| WO | WO 00/72572 A1 | 11/2000 |
| WO | WO 00/74430 A2 | 12/2000 |
| WO | WO 01/28219 A2 | 4/2001 |

OTHER PUBLICATIONS

European Telecommunication Standard, ETS 300 580-1, "Digital Cellular Telecommunications System (Phase 2), Full Rate Speech, Part 1P: Processing Functions", Global System for Mobile Communications, Mar. 1998, pp. 1-2, 5, 7-11, Second Edition, GSM 06.01 version 4.0.7, Cendex, France.

* cited by examiner

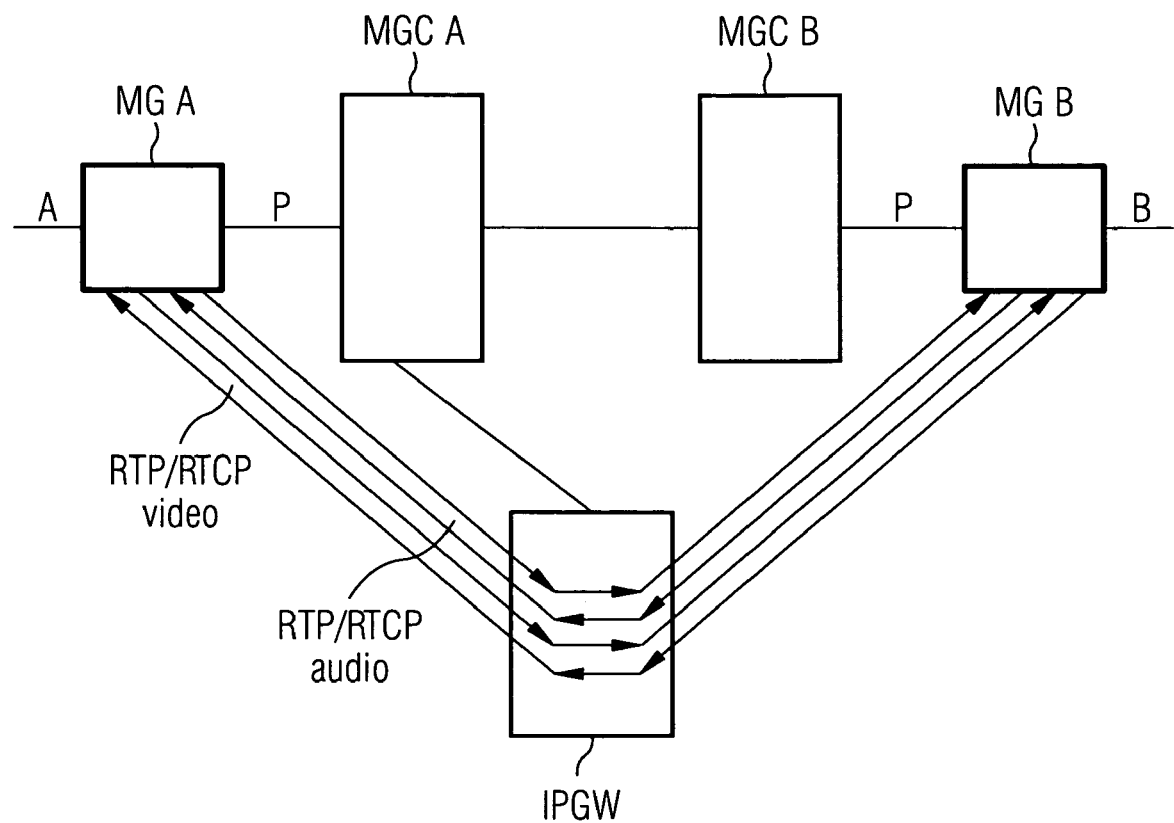

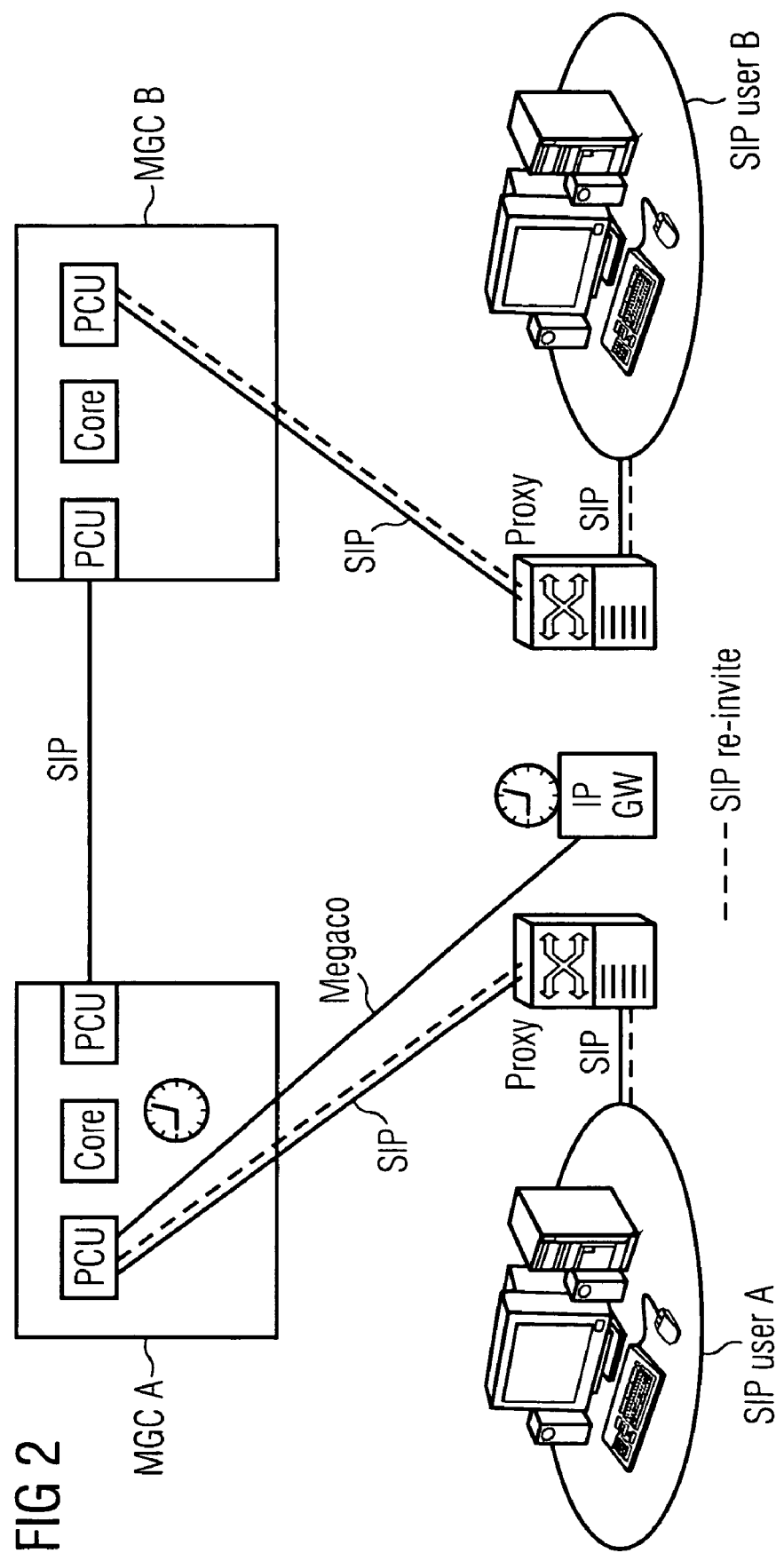

DEVICE AND METHOD FOR BILLING CONNECTIONS THAT ARE ROUTED VIA A PACKET NETWORK

CROSS REFERENCE TO RELATED APPLICATIONS

This application is the US National Stage of International Application No. PCT/EP2005/050878, filed Mar. 1, 2005 and claims the benefit thereof. The International Application claims the benefits of German application No. 102004011459.5 DE filed Mar. 9, 2004, both of the applications are incorporated by reference herein in their entirety.

FIELD OF INVENTION

The present invention relates to a device and to a method for billing connections that are routed via a packet network.

BACKGROUND OF INVENTION

With regard to the widespread introduction of video telephony, telecommunications network operators wish to offer the high quality and high user convenience that is known from public telephony networks and cable TV networks. As a rule, however, this cannot be achieved via networks operating an Internet protocol. To satisfy these requirements requires the development of solutions using set-top boxes connected by hardwired modem or xDSL to TV sets rather than PCs. This makes it easy and convenient to convert from TDM to IP using little more than the video bandwidth option and TV remote control. In addition, the quality of service (availability, transmission quality, freedom from interference, etc.) and the security aspects have to be the same as those already known from the public network. Of special interest to customers in this regard is the fair, detailed and comprehensible billing system which is known from public telephone networks, and which must without fail include time-based billing for the purpose of correct implementation.

Time-based billing is already known from the TDM world. This provides TDM channels that are routed into the switching center. Billing in the switching center, for example for each channel, then takes place for as long as the connection lasts. Interference is therefore directly detected and the connections concerned are released immediately. When the connections are released billing is also stopped. Though this approach would be suitable for audio and video via TDM (where the number of channels determines the quality and charge), it cannot be used in a packet network.

This is because in packet-oriented connections, such as those routed via IP networks, the useful data stream is preferably routed directly between the subscribers concerned rather than through the switching center. As a rule, any network failures that interrupt said useful data stream are not directly detected in the packet-based switching centers responsible for the connection. Billing therefore continues to run, even though the useful data stream has already been interrupted. The connection cannot be released and billing cannot be stopped until the network interference is disclosed via the signaling. A signaling path is rarely disturbed at the same time as the useful data path, since signaling data and useful data are routed via different paths and links.

Furthermore a signaling loss that occurs in the stable call state cannot be detected without further measures, since no signaling messages are exchanged in this state. As a rule, a loss of useful data transmission is detected in the terminal devices or quasi-terminal devices, which then inform the packet-based switching center via signaling. However, this can be delayed and is not reliable, since the signaling path could be experiencing interference at the same time.

For these reasons, in the case of packet-based connections in which the useful data stream is routed directly between subscribers or their terminal devices via a packet network, billing is preferably provided on a flat rate basis or per event (polling a proxy to establish a connection). Although this approach is very simple and suitable for packet networks, it cannot be described as exact billing with regard to duration, volume or quality.

It has therefore been proposed in the prior art that when the useful data stream is directly routed between subscribers or terminal devices via the packet network, billing should be performed on a time basis in the A-side link node. On a cyclical basis the A and B-side link nodes check whether each connected port is available for signaling. A cyclical value of 20 s is typically used. Any connection found to be unavailable is released in order to stop the billing. Although this approach is very simple and suitable for packet networks, it cannot be said to achieve exact billing with regard to duration, volume or quality. Furthermore the polling load on the link nodes and network seems to be a serious disadvantage. The volume and quality of the connection are not taken into consideration.

As a result of this problem the subscriber is overcharged in the event of a failure or interference. However, the subscriber can easily check the billing accuracy from the itemized bill. Any overcharge for a connection that the customer knows to have been disrupted is disclosed in the corresponding itemized bill from the network operator. The network operator may then receive complaints or even become involved in legal disputes with the customer.

SUMMARY OF INVENTION

An object of the invention is to demonstrate a way in which time-based billing can be efficiently provided in a packet network.

This object is achieved by features specified in the claims.

The particular advantage of the invention arises from the fact that the useful data stream transmitted between two subscribers is routed via an IP gateway. Then the useful data streams in a connection comprising a plurality of useful data streams are separately logged in the IP gateway. Faults or network interference giving rise to an interruption or break in the useful data stream will then be quickly and reliably detected, and billed with the high degree of accuracy known from conventional call processing systems (e.g. 1 s or 500 ms). This concept therefore provides exact, time-based billing of a packet-based connection (IP). Overcharging or undercharging for an IP connection can be avoided. The advantage for the operator and the customer alike is fair billing to the satisfaction of both.

Moreover with this invention it is possible to log all billing-related information (audio, video, bandwidth, RTCP quality parameters, etc.). Then for example a change in the connection characteristics (e.g. from audio to audio plus video) can also be supported and substantiated for billing purposes. Itemized bills can further be compiled with exact information concerning service-related time intervals and bandwidth/codec information. Quality criteria can likewise be taken into account.

It is also particularly advantageous that the outlay for such a configuration can be kept very low. For instance existing billing interfaces and postprocessing methods (such as a breakdown of video/audio ratios by link within the itemized bill) can be used without the need for further action. This concerns for example the billing center interfaces known from TDM switching systems.

The amount of additional signaling to be performed by the call control server responsible for billing is kept to a minimum by having the IP gateway controlled from the A-side or B-side peripherals of said server. On the other hand, however, there is a significant reduction in the transfer of signaling messages due to removal of the polling load on the A-side or B-side link node for the purpose of avoiding the billing of non-existent connections following a separation of link nodes and subscribers' line equipment. Furthermore it is also possible to avoid all cases of failure in which the billing of a non-existent connection in the packet network continues due to the non-appearance of call termination signaling from the A-end or B-end subscriber (loss of "on hook").

Lastly fraud situations can be avoided. This is due to the fact that the subscribers participating in a connection are not informed of the packet address of their respective partner. The advantage is that because of this the two subscribers cannot establish a direct connection bypassing the IP gateway responsible for billing. Likewise it is not necessary to seal the set-top boxes of connected subscribers, though this is occasionally the case in the prior art.

Advantageous developments of the invention are specified in the dependent claims.

BRIEF DESCRIPTION OF THE DRAWINGS

The invention will be explained in greater detail below with the aid of an exemplary embodiment and accompanying figures.

The figures show the following:

FIG. 1 A network configuration with media gateways and media gateway controllers together with an IP gateway, FIG. 2 The embodiment on the basis of SIP and H.248 protocol.

DETAILED DESCRIPTION OF INVENTION

FIG. 1 shows a configuration according to the invention. Media gateways MG A (A-side media gateway) and MG B (B-side media gateway) are provided. According to the present exemplary embodiment, both media gateways are intended to take the form of set-top boxes with subscriber-side connections to the subscriber terminal devices A, B. The two media gateways or set-top boxes MG A and MG B are controlled via a protocol P by call control servers or media gateway controllers MGC A, MGC B respectively. The control protocol P used for this purpose can be a protocol known per se such as the MGCP called H.323 or the SIP protocol. Both controllers exchange information via an inter-office signaling protocol known per se. The connection-related signaling information between the two subscriber terminal devices A, B taking part in the connection is routed via the two set-top boxes and the two media gateway controllers (signaling link). The present exemplary embodiment shows two media gateway controllers. This number is not however a mandatory requirement for the invention. A plurality of media gateway controllers can be used, as can a single media gateway controller.

The invention now provides for the useful data connection (bearer link) to be routed via an IP gateway IPGW (loop connection). In the case of a purely audio connection the useful data routed via the bearer link is audio and in the case of a video connection it is audio plus video. In the latter case for example there are two useful data streams in a single connection, as FIG. 1 shows. The useful data stream is thus routed indirectly between the packet-based end points (set-top boxes) MG A and MG B. The useful data is transmitted with the aid of the real time protocol RTP and the real time control protocol RTCP.

The IP gateway IPGW is likewise controlled with the aid of a protocol known per se such as H.248 by the media gateway controller MGC A responsible for billing. The A-side media gateway controller MGC A is preferably intended to assume the function of the controller responsible for billing. The billing tickets (call data records, CDR) for interference-free connections are created here in the A-side controller. They include the required accuracy level (e.g. billing to an accuracy of 1 s) and have a sequence of information elements, documenting in the case of the link concerned the beginning, end and type (audio, video and where appropriate, bandwidth or codec). Further information is also recorded during a connection, such as a change in the type characteristic (e.g. audio <-> video). Complementary information on communication quality, the duration of the communication, audio and video carrier bandwidth/volume, can be provided as CDR in the IP gateway IPGW or reach the media gateway controller responsible for billing via the signaling.

An outgoing connection request from the subscriber terminal device A is notified to the subscriber terminal device B via the two media gateway controllers MGC A and MGC B. If the subscriber terminal device B accepts the call, the bearer link is set up in bidirectional mode (that is, in the forward and return directions) between the media gateway MG A and the IP gateway IPGW, and between the IP gateway IPGW and the media gateway MG B. Billing now starts in the IP gateway. According to the invention, the two media gateways MG A and MG B together with the IP gateway (IPGW) ensure that RTP/RTCP packets are transmitted at a minimum separation typically defined as 100 ms, regardless of connection type, encoding method and packetizing length. It is intended that it shall be possible to configure this minimum separation. The MG A, MG B and the IP gateway thus preserve the integrity of the useful data stream so long as IP packets in the useful data stream arrive with this minimum separation.

The generation of RTP packets at a definable minimum separation in time is satisfied for voice connections and no further requirement. A packet is generated even if this would not be necessary due to the "silence suppression" feature in the audio stream, a still-picture transfer in the video stream, a missing input signal, or the encoding method or packetizing length used. In the interests of quality control of the through-connected RTP carrier, both the IP gateway IPGW and the media gateways MG A and MG B monitor the arrival of said IP packets at the guaranteed minimum separation.

If the IP gateway IPGW now detects the non-appearance of an IP packet within the minimum separation time, it waits a certain guard period $T_1$ (such as 200 ms) before defining the connection as inactive after which it stops the transfer of packets to the other end and in the return direction. Furthermore a corresponding billing ticket is immediately written and transmitted to the media gateway controller MGC A.

The non-appearance of IP packets can also be detected in like manner by the two media gateways MG A and MG B. In this case the transfer of packets is stopped in the return direction and signaling is sent to the associated media gateway controller MGC A or MGC B, which then initiates release of the connection concerned.

In order to reduce the signaling load on the controller and network in the context of normal call termination by the A or B side, break signaling can be delayed by a defined guard period $T_2$ in the media gateways (e.g. 2 s). A regular connection release by subscriber terminal device A or B then causes the break in the RTP stream to be detected in the IP gateway IPGW and in the media gateways MG A and MG B. However, the provision of the guard period $T_2$ enables the connection release to proceed as normal (call flow), causing no increase in signaling load. The billing information can be stated online via signaling between IPGW and MGC A or offline in the context of postprocessing in the billing center by including the information directly from the IP gateway. The billing information is stated with the aid of connection identifying information stored in the IP gateway. This identifying information can likewise be transferred for evaluation to equipment other than the controller MGC A responsible for billing.

The configuration to which the invention relates will tolerate the failure of different devices without excessively affecting billing.

A failure in one of the media gateways MG A or MG B interrupts RTP/RTCP packet transfer in the IP gateway IPGW. This interruption is subsequently signaled by the respective other end, that is, GW A or GW B. The exact billing information is then present in the IP gateway. Since the billing information in the IP gateway can be very accurately determined, any billing information recorded in parallel in the controller can be stated online by signaling or offline via separate CDRs from the IP gateway.

The simultaneous failure of both media gateways MG A and MG B likewise interrupts the RTP/RTCP packet transfer in the IP gateway. In this case too, the exact billing information is determined in the IP gateway. The interruption is disclosed by signaling from the media gateways and immediate notification from the IP GW to the call control server, after the A or B side becomes available again. Since the billing information in the IP gateway can be very accurately determined, any billing information recorded in parallel in the controller can be stated online by signaling or offline via separate CDRs from the IP gateway.

The temporary isolation of the media gateway controller responsible for billing (either MGC A or MGC B) does not cause a break in the useful data streams. Even if the connection is released after this interference, the effect is as if there had been no interference beforehand. If the connection is released during said interference, the information is produced by the media gateway MG A or MG B or via the IP gateway no later than after return of availability by repeating the release signal or another protocol-specific message. The exact billing information is then present in the IP gateway. The billing information can if necessary be stated online by signaling or offline via separate CDRs from the IP gateway.

A communication loss between the media gateway controller responsible for billing and the IP gateway causes the connections concerned to be released. This is necessary because the case could arise in which the billing information is no longer available in the IP gateway and the "on hook" messages signaled by the media gateway controller MG A or MG B have been lost.

High-frequency monitoring by exchange of signaling is still needed for the IP gateway, but not for each of the media gateways. However, since the IP gateway is de facto rather large, this does not lead to any further reduction in the signaling load and the network load.

Certain network operators require that billing should indeed be stopped in the event of interference, but the connection to the remote end should not be released. This requirement is fulfilled by a configuration and a method according to FIG. 1. If on the other hand there is a requirement for the connection to be released without fail in the event of interference, this requirement can be addressed by releasing in the IP gateway in isolation from the call controller. An alternative form of control can be achieved by means of administration or configuration parameters.

FIG. 2 shows in detail the configuration and method to which the invention relates. In the example shown here it is assumed that following subscriber input during a call controlled by the terminal device and routed via TDM switching centers, a new call is established via the IP network. This second call is a continuation of the first call and enables further performance features, such as additional sections of videotelephony in the connection. This second call can establish not only a voice connection but also a voice plus video connection. The subscriber can toggle at will between audio and audio plus video transmission. Exact billing must be available without fail for these IP connections, just as in the case of the TDM call. In particular the operator wishes to be able to bill the different services (audio, video etc.) separately.

The protocol used for signaling to the subscriber is standard SIP protocol. The subscriber terminal devices used are SIP terminal devices (SIP user A, SIP user B). A media call control protocol is used for controlling the IP gateway. The H.248 protocol is intended to be used for preference in this case. The call control server MGC A or MGC B (media gateway controller) is in the form of a switching processor. A SIP proxy server is connected upstream of said switching processor. The signaling messages between subscriber and switching processor are routed via the SIP proxy server.

The switching processors MGC A or MGC B have a peripheral unit PCU responsible for the IP interface and for handling the IP protocols. They further have a call processing core system which can control both IP call processing and TDM call processing, and also has a built-in billing interface. The interface between the PCU and the core system uses an internal protocol.

Billing is intended preferably to be performed A side. A call is billed according to the following sequence.

A SIP:invite message with SDP information (audio codecs) is sent from the subscriber (SIP user A) to the unit PCU. Once the A-side unit PCU has received an invite message it creates in the IP gateway, via Megaco, the resources for the new call (add two new ephemeral terminations). The SDP data from the A side is immediately transferred to the IP gateway. The IP gateway furthermore receives a call reference and uses this in the billing tickets for this connection.

The SDP data (IP address and port) is handled B side using the data returned from the IP gateway. When the B side has been detected in the core system and the B side has accepted the call, the B side acknowledges the invite message by means of a SIP:200ok message. This 200ok message is used in the A side as a criterion for starting the audio billing. The unit PCU sends the core system a corresponding internal message.

The IP gateway IPGW is on the one hand supplied with the SDP data from the B side and on the other is set to send-receive. Monitoring of the RTP stream begins. If a further SIP:invite message having SDP information (audio codecs plus video codecs) reaches the unit PCU from a subscriber and is acknowledged positively by the other party, it is again accepted by means of a SIP:200ok message. The IP gateway is supplied with the new codec information. Simultaneously with the SIP:200ok message, the unit PCU sends a message A side to the core system, indicating use of the video service.

A further SIP:invite message with SDP information (audio) is handled in a like manner by the unit PCU. If the other party positively acknowledges and accepts by means of SIP:200ok that the video transmission should be turned off, the unit PCU sends a message to the core system, indicating use of the audio-only service. The IP gateway is then supplied with the new codec information.

Billing is stopped A side by means of the SIP:bye message from one side of the call. Simultaneously the call is also released in the IP gateway (subtract the two terminations). If there is no network interference, a billing accuracy of 500 ms can be achieved, as network operators usually demand.

Given such a configuration and such a method, billing errors can be avoided in the event of failures.

For instance the failure of the A side in the RTP stream is detected by the B side and reported to the unit PCU, where the call is released. The IP gateway also detects non-appearance of RTP packets from the A side and reports the exact duration of the connection to the unit PCU.

The failure of the B side is handled in like manner to the failure of the A side. Network interference which interrupts the communication of the PCU to the A and/or B side does not cause the call to be released so long as there is a connection from the unit PCU to the IP gateway and the latter does not report any RTP interference. Any "on hook" messages are repeated by the terminal devices until the network fault is remedied. The exact time-related data concerning the duration of the RTP connection is determined on the IP gateway, which stores it and signals it to the unit PCU. If the IFP gateway detects disruption to the RTP stream, it signals this to the unit PCU. The call is released and billed with sufficient accuracy.

If the PCU/IP gateway connection fails, all calls via this IP gateway are released, otherwise neither exact billing nor the availability of the bearer link can be guaranteed.

The invention claimed is:

1. A method for billing for a connection routed via a packet network, comprising:
    starting the billing when the connection is established between a plurality of subscriber terminals;
    transmitting information packets according to a quality standard by at least one of the terminals;
    routing the information packets in the network via a central device controlling a quality; and stopping the billing if the quality standard is not met; and
    when the quality standard is not met:
        stopping the transfer of information packets, and
        signaling to a controller responsible for billing that transmission has stopped.

2. The method as claims in claim 1, wherein the quality standard is defined by a minimum separation in time between information packets consecutively transmitted.

3. The method as claimed in claim 1, wherein in order to transmit the information packets within the minimum separation time, a packet is transmitted regardless of a feature that does not require the packet transmission.

4. The method as claimed in claim 3, wherein the feature is selected from the group consisting of a silence suppression, an encoding method, and a packetization method.

5. The method as claimed in claim 1, wherein billing information that relates to a connection and is present in a controller responsible for billing is stated by the central device.

6. The method as claimed in claim 1, wherein billing information is sent via a signaling interface between a controller responsible for billing and the central device, and wherein a media gateway control protocol is used to send the billing information.

7. The method as claimed in claim 6, wherein the billing information includes a time duration calculated from the start of the billing to the end of the billing.

8. The method as claimed in claim 7, wherein the billing information further includes characteristics of the transmission that affect billing, the characteristics selected from the group consisting of the number of packets, packet length, packet loss rate, and peak throughput.

9. The method as claimed in claim 1, wherein each of the terminals monitors the quality standard.

10. The method as claimed in claim 1, wherein the information packets are IP packets, ATM packets or frame relay packets.

11. An arrangement for billing for a connection routed via a packet network, the connection between a plurality of subscriber terminals, comprising:
    a data stream of information packets exchanged between subscribers, billing for the data once the connection is established;
    a quality standard of the connection; and
    a central device arranged within the network, the device having a quality control and routes the information packets, and stops the billing when the quality standard is not and when the Quality standard is not met:
        stopping the transfer of information packets, and
        signaling to a controller responsible for billing that transmission has stopped.

12. The arrangement as claimed in claim 11, wherein the central device is in the form of an IP gateway.

13. A method for billing for a connection routed via a packet network, comprising:
    initiating the connection by a first subscriber terminal to a second subscriber terminal;
    starting the billing when the connection is established between the terminals;
    providing a signaling path between the subscribers;
    transmitting information packets by at least one of the terminals, the packets transmitted so that a minimum separation in time occurs between information packets consecutively transmitted; and
    stopping the billing if packet separation is greater than a guard time, wherein the signaling path is a different path than provided by the connection,
    when packet separation is greater than the guard time:
        stopping the transmitting of information packets; and
        signaling to a controller responsible for billing that transmission has stopped.

14. The method as claimed in claim 13, wherein the guard time is less than 1 second.

15. The method as claimed in claim 14, wherein the guard time is 100 milliseconds.

16. The method as claimed in claim 14, wherein in order to transmit the information packets within the minimum separation time, a packet is transmitted regardless of a feature that does not require the packet transmission.

17. The method as claimed in claim 14, wherein each of the terminals monitors the transmission to determine if the transmission is within the guard time.

* * * * *